US006268205B1

(12) United States Patent
Kiest et al.

(10) Patent No.: US 6,268,205 B1
(45) Date of Patent: Jul. 31, 2001

(54) SUBSURFACE DECONTAMINATION METHOD

(75) Inventors: John L. Kiest, Matteson, IL (US); Jerrold A. Trezzo, Porter, IN (US)

(73) Assignee: Biomanagement Services, Inc., Tinley Park, IL (US)

( * ) Notice: Subject to any disclaimer, the term of this patent is extended or adjusted under 35 U.S.C. 154(b) by 0 days.

(21) Appl. No.: 09/301,087

(22) Filed: Apr. 28, 1999

Related U.S. Application Data
(60) Provisional application No. 60/084,017, filed on May 4, 1998.

(51) Int. Cl.$^7$ ...................................................... C12S 13/00
(52) U.S. Cl. ....................... 435/262.5; 405/128; 588/205; 210/631; 210/759; 210/747
(58) Field of Search .................................. 435/262, 262.5, 435/264; 405/128; 588/205, 206, 207, 218, 248; 210/610, 620, 631, 759, 747

(56) References Cited

U.S. PATENT DOCUMENTS

| | | |
|---|---|---|
| 3,912,490 | 10/1975 | Boghosian . |
| 4,119,429 | 10/1978 | Lovness . |
| 4,155,738 | 5/1979 | Boghosian . |
| 4,293,426 | 10/1981 | Gago . |
| 4,399,633 | 8/1983 | Haughey et al. . |
| 4,401,569 | 8/1983 | Jhaveri et al. . |
| 4,470,839 | 9/1984 | Gago . |
| 4,849,360 | 7/1989 | Norris et al. . |
| 5,006,250 | 4/1991 | Roberts et al. . |
| 5,061,119 | 10/1991 | Balthaus et al. . |
| 5,133,625 | 7/1992 | Albergo et al. . |
| 5,172,709 | 12/1992 | Eckhardt et al. . |
| 5,264,018 | 11/1993 | Koenigsberg et al. . |
| 5,279,740 | 1/1994 | Basile et al. . |
| 5,286,140 | 2/1994 | Mather . |
| 5,304,704 | 4/1994 | Kammeraad . |
| 5,346,826 | 9/1994 | Andrews . |
| 5,362,400 | 11/1994 | Martinell . |
| 5,395,419 | 3/1995 | Farone et al. . |
| 5,415,777 | 5/1995 | Krempen et al. . |
| 5,525,008 | 6/1996 | Wilson . |
| 5,610,065 | * 3/1997 | Kelley et al. ........................ 435/264 |
| 5,623,992 | 4/1997 | Shaw . |
| 5,641,020 | 6/1997 | Cherry et al. . |
| 5,741,427 | * 4/1998 | Watts et al. ........................... 210/747 |
| 5,879,107 | 3/1999 | Kiest et al. . |
| 5,955,350 | * 9/1999 | Soni et al. ........................... 435/264 |
| 5,967,230 | * 10/1999 | Cooper et al. ........................ 166/245 |

OTHER PUBLICATIONS

Kao et al. Caplus Abstract AN: 1998:93655 of 'Remediation of dioxin contaminated soil enhanced by chemical oxidation pretreatment.' Contam. Soils (1997), 2, 191–203.*
Lee et al. Caplus Abstract An: 1992:577591 of 'Biodegradation of PCP enhanced by chemical oxidation pretreatment.' Water Environ. Res. (1992), 64(5), 682–90.*

Martens et al. Caplus Abstract An: 1994:563163 of 'Feasibility of in situ chemical oxidation of refractile chlorinated organics by hydrogen peroxide–generated oxidative radicals in soil.' Emerging Technol. Bioremediation Met. 2nd (1994), 74–84.*

Ravikumar et al. Caplus Abstract An: 1992:10755 of 'Effectiveness of chemical oxidation to enhance the biodegradation of pentachlorophenol in soil.' Hazard. Ind. Wastes (1991) 23rd., 211–21.*

Jane L. Vernalia. 1977. "Bioremediation of Pentachlorophenol in Soil Under Anaerobic and Aerobic Conditions" ORC Oracle, vol. 1, No. 4.

Michael A. Heitkamp. 1997. "Effects of Oxygen–Releasing Materials on Aerobic Bacterial Degradation Processes" Bioremediation Journal I (2):105–114 (1997).

Bianchi–Mosquera, G.C., R.M. Allen–King, and D.M. Mackay. 1994. "Enhanced Degradation of Dissolved Benzene and Toluene Using a Solid Oxygen–Releasing Compound". Ground Water Monitoring Rem. 14 (1):120–128.

Richard J. Watts, Matthew D. Udell, and Robert M. Monsen. 1992. "Use of Iron Minerals in Optimizing the Peroxide Treatment of Contaminated Soils." Water Environment Research. 65(7) :839–844.

Richard J. Bigda. 1996. "Fentons Chemistry: An Effective Advanced Oxidation Process." Environmental Technology. May–Jun. 1996:34–39.

Bryan W. Tyre, Richard J. Watts, and Glen C. Miller. 1991. "Treatment of Four Biorefractory Contaminants in Soils Using Catalyzed Hydrogen Peroxide." Journal of Environmental Quality 20:832–838.

Vesper, S.J., L.C. Jurdoch, S. Hayes, and W.J. Davis–Hoover. 1994. "Solid Oxygen Source for Bioremediation in Subsurface Soils." J. Hazard.Materials. 36:265–274.

* cited by examiner

Primary Examiner—William H. Beisner (57) ABSTRACT

Disclosed is a method of decontaminating subsurface soil and/or groundwater in situ through the underground injection, immediately after mixing, of water and a powderized formulation of a dry mixture of metallic peroxides, such as calcium, magnesium, sodium, or other metallic peroxides, blended with decomposition rate modifiers, pH adjusters and iron salts, which, depending upon the concentrations of these individual compounds, generates hydrogen peroxide and subsequent powerful oxidizing agents on a desired, timed-release basis over a first relatively short period of time (e.g. several days). The reaction between the hydrogen peroxide and the iron salts produces hydroxyl and perhydroxyl radicals which rapidly oxidize organic contaminants leaving a residual which time-releases oxygen to thereafter enhance intrinsic bioremediation processes over a second longer period of time (e.g. several months). Micronutrients, macronutrients or other beneficial compounds may be included to further enhance intrinsic bioremediation processes.

20 Claims, 7 Drawing Sheets

Fig. 1

CUTAWAY VIEW OF UNDERGROUND POLUTED ZONE

Fig. 2

CUTAWAY VIEW OF UNDERGROUND POLUTED ZONE

SUBSURFACE DECONTAMINATION METHOD

This application claims the benefit of U.S. Provisional Application Number 60/084,017, filed May 4, 1998.

FIELD OF THE INVENTION

The present invention relates to a method of treating underground carbon-based contaminants using an injected fluid.

BACKGROUND OF THE INVENTION

Metallic peroxide compounds have been formulated for the purpose of releasing oxygen in situ to support biodegradation of contaminants. U.S. Pat. No. 5,264,018 issued Nov. 23, 1993 to Koenigsberg, et al. describes the use of magnesium peroxide in soils as an oxygen releasing compound. Such material is described in (U.S. Pat. No. 5,395,419 issued Jan. 14, 1993 to Koenigsberg, et al.) as being an oxygen liberating compound for the enhancement of aerobic microbes in the biodegradation of waste materials and as a Therapeutic and Preventative Treatment of Anaerobic Plant and Soil Conditions.

FMC Corporation has sold a product trademarked "Permeox" which includes Calcium Peroxide. This product is marketed as an "oxygen source" for bioremediation. FMC points out in their literature that the intermediate step for oxygen generation is the formation of hydrogen peroxide. This reaction is as follows:

$$CaO_2 + 2H_2O \rightarrow Ca(OH)_2 + H_2O_2$$

The second stage of the reaction which liberates molecular oxygen is as follows:

$$2H_2O_2 \rightarrow O_2 + 2H_2O$$

Numerous papers have been written on the benefits of using oxygen releasing materials on aerobic bacterial degradation processes. Examples of these are: Jane L. Vernalia, 1977, "Bioremediation of Pentachlorophenol in Soil Under Anaerobic and Aerobic Conditions" *ORC Oracle*, vol. 1, no. 4; Michael A. Heitkamp, 1997, "Effects of Oxygen-Releasing Materials on Aerobic Bacterial degradation Processes", *Bioremediation Journal I* (2):105–114 (1997); Bianchi-Mosquera, G. C., R. M. Allen-King, and D. M. Mackay, 1994, "Enhanced Degradation of Dissolved Benzene and Toluene Using a Solid Oxygen-releasing Compound" *Ground Water Monitoring Rem.* 14 (1):120–128; and Vesper, S. J., L. C. Jurdoch, S. Hayes, and W. J. Davis-Hoover, 1994, "Solid Oxygen Source for Bioremediation in Subsurface Soils", *J. Hazard Materials*, 36:265–274.

The use of hydrogen peroxide with iron as a co-reagent, was first reported by the English chemist, Dr. H. J. H. Fenton in 1894. Research has been conducted and reported describing Fenton's chemistry which is based on the production of the hydroxyl and perhydroxyl radicals from hydrogen peroxide. See for example: Richard J. Watts, Matthew D. Udell, and Robert M. Monsen, 1992, "Use of Iron Minerals in Optimizing the Peroxide Treatment of Contaminated Soils", *Water Environment Research*, 65(7):839–844 and Richard J. Bigda, 1996, "Fentons Chemistry: An Effective Advanced Oxidation Process", *Environmental Technology*. May-June 1996:34–39. These highly reactive compounds rapidly oxidize carbonaceous materials.

However, hydrogen peroxide is relatively unstable, potentially unsafe and typically does not survive in the subsurface long enough to be effective or practical as either an oxygen supplement or as an oxidizing reagent. In addition, the technical difficulties involved in delivering hydrogen peroxide to the contaminated media have limited its use. Hydrogen peroxide is also toxic to microorganisms in higher concentrations.

It has been reported by Bryan W. Tyre, Richard J. Watts, and Glen C. Miller, 1991, "Treatment of Four Biorefractory Contaminants in Soils Using Catalyzed Hydrogen Peroxide", J. of *Environmental Quality* 20:832–838, that bio-refractory organic pollutants such as chlorinated compounds can be oxidized using catalyzed hydrogen peroxide (Fenton's reagent). These materials, along with certain hydrocarbons, present a challenge to biodegradation because of the lack of reactive sites on the molecules.

Traditional remedial technologies such as a simple pumping and treating of groundwater, vacuum extraction of volatile organic compounds, thermal treatment of contaminated soil or excavation and landfilling of contaminated soil are typically costly, disruptive to normal site activities and may only transfer contaminants to another location or convert them to another form.

While these techniques and systems have advantages in some circumstances, they all suffer from economical, technical or time drawbacks. That is, they are either quite expensive to carry out and disruptive of the site, or they are technically limited by the site hydrology and the nature of the contaminant, or they take a very long time to be effective. There thus exists a need for an economical method that is less disruptive to site activities, less restricted by site hydrology, contaminant type and concentration and still achieve substantial results within a reasonable period of time.

Although in situ bioremediation is becoming increasingly popular as a remedial technology, this process is typically slow and may be inhibited by high contaminant concentrations or the presence of free phase contaminants. In addition, many organic contaminants are biorefractory and, therefore, resistant to biodegradation. The technical difficulties involved in delivering nutrients and oxygen supplements such as metallic peroxide into the subsurface media has also restricted the effectiveness of in situ bioremediation.

SUMMARY OF THE INVENTION

In overcoming one or more of the drawbacks of the prior art, the present invention provides a method of treating organic contaminants in soil and/or groundwater.

Soil and/or groundwater contaminated with organic pollutants are decontaminated in accordance with the present invention by a two stage process. The first stage involves the in situ generation of hydrogen peroxide on a desired, time-released basis which reacts with natural and/or introduced co-reagents to produce hydroxyl and perhydroxyl radicals which act as powerful oxidizing agents to oxidize a wide variety of organic contaminants. Complete oxidization of organic contaminants results in carbon dioxide and water as the end products. Any remaining intermediate byproducts are more easily mineralized by intrinsic biodegradation processes.

The inventors have determined that significant oxidative activities occur with the present invention at a pH range of approximately 6 to 9, which is the range typically encountered in the subsurface media. This is also the optimum pH range for microbial activity. The oxidative reaction potentially occurs for the site-specific life of the formulation dependant upon availability of co-reagents (such as iron salts) and the availability of carbonaceous material. If a co-reagent or a carbon source is not available, the hydrogen peroxide will eventually decompose to produce oxygen. Although oxidative chemistry is not necessarily selective in the destruction of organic compounds, the inventors have determined that, unless the composition is over-applied, the controlled generation of hydrogen peroxide, and subsequently, free radicals over a longer period of time prevents significant negative impact to the indigenous microbial community. In the event of over-application the microbial community will quickly re-establish itself due to the resulting oxygen and nutrient enriched environment.

The second stage of this process involves enhancing intrinsic biodegradation processes. Once the initial oxidation phase is completed, the composition continues to produce molecular oxygen on a timed-release basis, dependant upon site chemistry, formulation and dosage rate. The oxygen enriched environment and the presence of less biorefractory carbon sources from incomplete oxidation have been observed to increase total heterotrophic plate counts and the number and quality of indigenous contaminant degraders.

This invention includes the application of an on-site mixture with water of a novel formulation, finely powdered, and the subsurface injection of the fluid. The formulation is a blend of environmentally safe compounds formulated to provide a timed-release (over a relatively short period) of hydroxyl radicals and perhydroxyl radicals to relatively quickly oxidize a variety of organic contaminants and to subsequently provide residual and timed-release (over a relatively long period) molecular oxygen and (optimally) essential nutrients to enhance intrinsic biodegradation processes, further degrading organic contaminants.

This invention utilizes a Fenton-like chemistry to produce a controlled release over a first period, typically several days, of powerful oxidizing agents which oxidize a variety of organic contaminants. Complete destruction of organic contaminants results in carbon dioxide ($CO_2$) and water ($H_2O$) as the end products. Any remaining intermediate byproducts are more easily mineralized by intrinsic biodegradation processes.

Since this invention is formulated to provide a slower, more controlled release of hydroxyl and perhydroxyl radicals than can be accomplished using hydrogen peroxide ($H_2O_2$), directly, sufficient time is available for the preparation, delivery and subsurface migration of the formulation. Oxidative reactions have been observed to occur in the subsurface for periods of time ranging from several hours to several days, dependant upon site chemistry, site geology, contaminant flux and application rates. This timed-release formulation precludes the build up of high temperatures and high vapor pressures typically encountered with the direct use of hydrogen peroxide, thereby providing a technology that is safe to both the environment and human health. As the hydroxyl and perhydroxyl radicals have a relatively short life span in the subsurface, they present no risk to groundwater quality.

The initial oxidative reaction of this formulation is accomplished by the timed decomposition of the metallic peroxides in the product. Upon completion of the oxidation phase of this process, the injected fluid continues to provide a timed-release of molecular oxygen to enhance intrinsic biodegradation processes. A continued release of molecular oxygen may occur for a period of two to four months, dependant upon contaminant flux formulation and dosage. Upon depletion of the available oxygen, nutrients contained in this invention continue to provide some degree of microbial degradation.

Since the hydroxyl and perhydroxyl radicals are not selective in their destruction of organic carbon, some impact to the indigenous microbial community may be anticipated. However, due to the slower, more controlled production of radicals with this invention, complete destruction of the microbial community is not typically encountered, unless the formulation is over applied. In the event of over application, once the hydroxyl and perhydroxyl radicals are depleted, the microbial community will quickly reestablish itself due to the presence of residual oxygen and nutrients resulting from the process.

Advantages

This invention employs a dry, more stable formulation that provides for safer and easier transportation, storage and handling as compared to liquid hydrogen peroxide. Hydrogen peroxide requires that special tanks be used for storage and that any water used for mixing be chemically analyzed so as to avoid potentially violent decomposition reactions.

The present invention is more stable than hydrogen peroxide and therefore allows more time to deliver the formulation throughout the contaminated media. In addition, the oxidation reaction occurs for a longer period of time, permitting more interaction over time. The greater stability of this invention provides for safer handling in the field, and the timed-release formulation precludes the buildup of potentially dangerous high temperature and high vapor pressure.

Due to the timed-release formulation, the indigenous microbial community is not destroyed because, although high concentrations of hydrogen peroxide are toxic to bacteria and high concentrations of radicals destroy microbial communities, the present mixture does not cause the concentrations to reach the level that destroys the indigenous microbes found in the soil and ground water that is being treated.

The formulation of this invention not only leaves residual oxygen, as does hydrogen peroxide, it also provides a longer-term, timed-release source of molecular oxygen.

The formulation also provides essential nutrients to enhance and prolong microbial activity once the oxygen is depleted.

The invention, together with further advantages and features thereof, may best be understood by reference to the following description, taken in connection with the accompanying drawings, in the several figures of which like reference numerals identify like elements.

DETAILED DESCRIPTION

Figure 1:
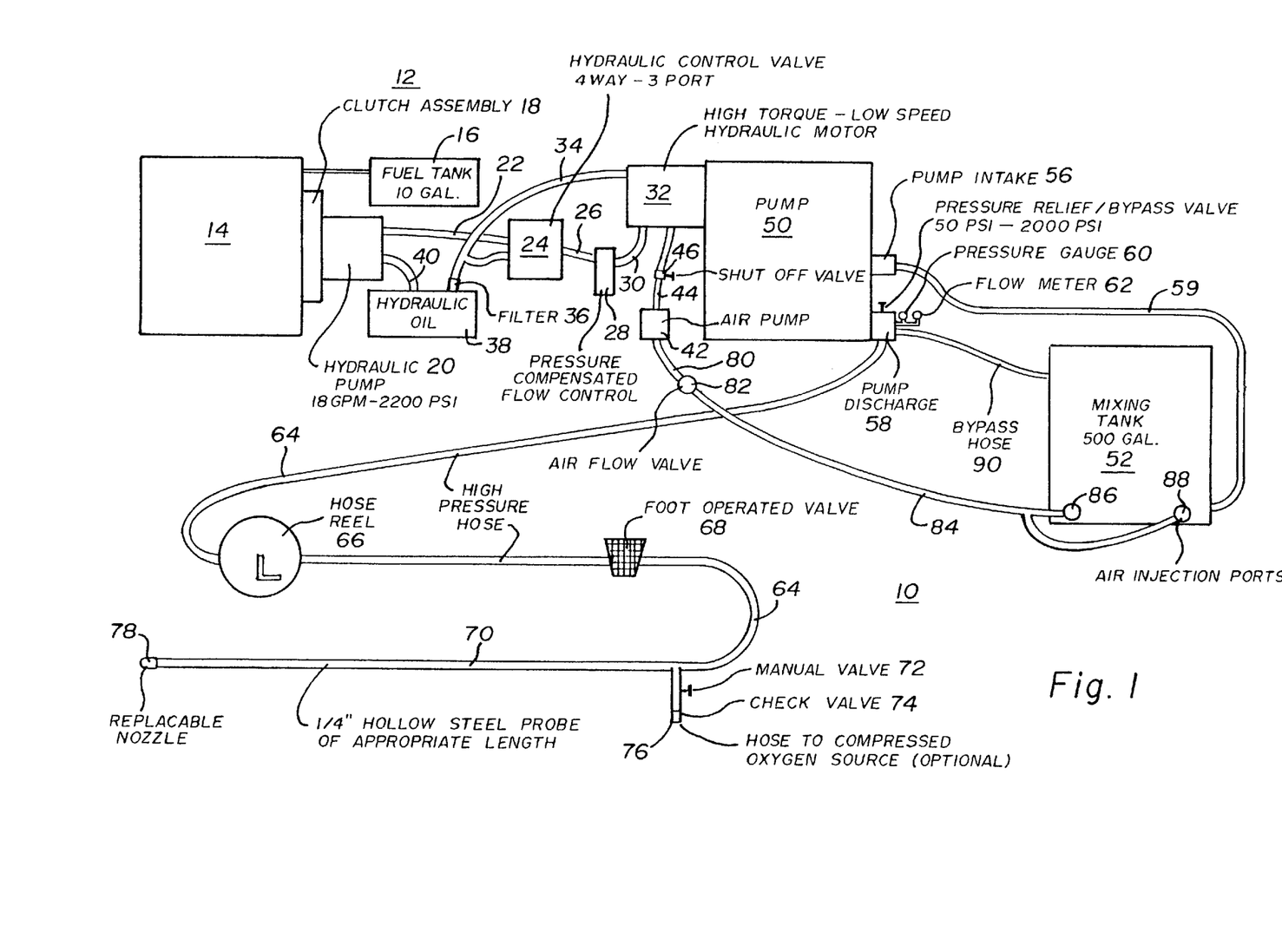
FIG. 1 is a schematic depiction of a preferred embodiment of apparatus constructed in accordance with the present invention.

Referring to FIG. 1, there is depicted an example of a delivery system 10 which can be used in practicing the present invention. This system is described in pending U.S. patent application Ser. No. 08/791,379, filed Jan. 30, 1997, now U.S. Pat. No. 5,879,107. The system 10 includes a power section 12, which may be entirely conventional and thus need not be described here in detail. This section 12 includes an internal combustion engine 14, e.g. 20 HP made by Kohler, fed by a suitable fuel source 16. The internal combustion engine 14 drives a hydraulic pump 20 through a clutch assembly 18. The pump 20 provides oil under pressure over a line 22 to a control valve 24, a line 26, a pressure compensated flow control 28, and a line 30 to a high torque—low speed hydraulic motor 32. The spent hydraulic oil from the motor 32 is delivered via a line 34 and filter 36 to a sump 38 which supplies the input to the hydraulic pump 20 via a line 40. An air pump 42 is run off of the pump 32 as indicated by the line 44 (which includes a shut off valve 46). The hydraulic return line from the air pump (not shown) is fed back to the sump 38.

The section 12 serves to selectively drive a fluid pump unit 50 which provides fluid in accordance with the principles of the present invention at high pressure and low volume. The fluid is drawn in a water slurry form from a suitable sized mixing tank 52 via a line 54 into the pump intake 56. The high pressure fluid is fed from the pump 50 to a discharge unit 58 which is equipped with a pressure gauge 60 and flow meter 62 and fed through a high pressure hose 64 which is mounted to a reel 66 and through a foot operated valve 68 to a manual lance or probe unit 70. This probe 70 preferably is constructed of ¼ inch inside diameter steel pipe of appropriate length for the job (a 28 foot long pipe being used in one application). At the hose connected end of the probe 70, a manual valve 72 is provided, a one way check valve 74 and a hose connection 76 for optionally allowing oxygen gas to be injected underground via the probe 70. The free end of the probe or lance 70 is provided with a replaceable nozzle 78 having an outlet hole.

The air pump 42 provides mixing air via hose 80, valve 82 and hose 84 to inlets 86 and 88 into the tank 52. The tank includes an opening (not shown) at its top to the atmosphere so the air supplied by the pump 42 serves to bubble up the liquid in the tank so as to keep its contents in a slurry state and to prevent the solids therein from settling out of suspension.

A bypass hose 90 is provided between the pumps outlet 58 and the tank 52 so as to allow the pump 50 to continually operate, even when the foot operated valve 68 is not depressed by the operator handling the probe 70, to allow fluid flow through the probe.

Figure 2:
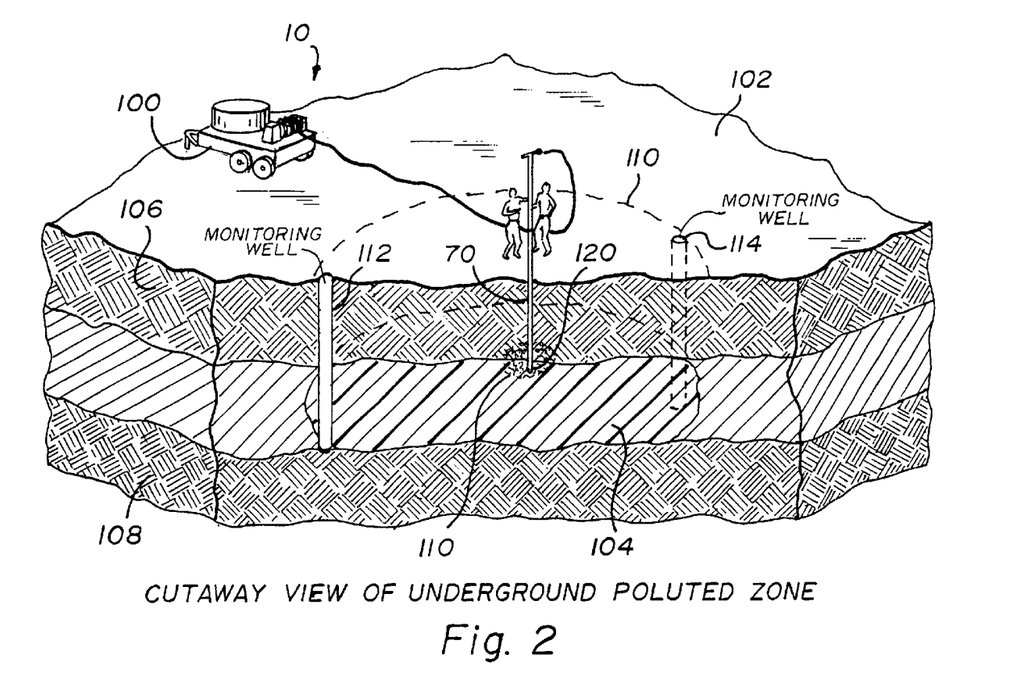
FIG. 2 is a perspective view of an underground site containing a zone of hydrocarbon contamination with the apparatus of FIG. 1 mounted on a trailer and in use in jetting an initial insertion to create a general cylindric core volume of infused fluid in the zone.

Referring to FIG. 2, the system 10 is there depicted mounted on a portable trailer 100 at a site 102 of an underground hydrocarbon pollution zone 104. As is conventional, the zone 104 has been defined by the test borings. In this example, it extends between a top layer 106 and a bottom layer 108 and extends under a surface area defined by the dashed line 110. A pair of monitoring wells 112 and 114 have been sunk and it has been determined that the zone 104 contains particular hydrocarbon pollutants well above the allowed or desired level.

Prior to treating a site, samples may be analyzed for nutrients, minerals, pH, contaminant concentrations, indigenous contaminant degrading microbes and dissolved oxygen.

In accordance with the present invention, a dry mixture formulation or composition in fine powdered form is provided from which a slurry is formed by mixing the composition with water. The mixture includes the peroxide of one or more of Calcium, Magnesium, or other metallic peroxides, decomposition rate modifiers and pH adjusters to adjust the pH of the fluid. This formulation is mixed in the tank 52 with water to form the amendment fluid or slurry for injection.

A series of surface access points (of e.g. ¾ inch diameter) are drilled through any surface paving, where required. The slurry is mixed and applied through the probe 70 (of e.g. ¼ inch inside diameter steel pipe). The high pressure fluid exiting the probe tip liquifies the soil in front of the probe allowing the probe 70 to be easily and quickly advanced into the subsurface by hand. Lateral pressure from the soil on the probe wall above the injection nozzle effectively seals the probe hole and minimizes leakage to the surface. The probe is rapidly advanced to the contaminated interval and then more slowly advanced to the deepest extent of contamination. The high pressure forces the amendment fluid into the formation enhancing permeability in the near radius of the probe hole via a limited degree of hydraulic fracturing. Amendment fluid is also forced into the migration pathways of the natural soil. Amendment fluid is forced into the subsurface until the site specific radius of influence is saturated and fluid begins to leak to the surface. The probe is then withdrawn by hand and moved to the next location. During treatment of subsequent locations, previous probe holes are monitored for leakage to the surface. The site specific radius of influence is established on the basis of this monitoring and treatment and injection points are spaced accordingly.

During treatment of the first location, natural migration pathways, pore spaces and pathways created by hydraulic fracturing are filled with fluid. If the location of the second hole is selected so that the radii of influence overlap, fluid being introduced in the second location forces fluid introduced in the first location back up the first probe hole (path of least resistance) to the surface.

As shown in FIG. 2, the process of treatment is starting out and an initial probe being made by the probe 70. This probe may be waterjetted into the zone 108 either using the water slurry as the water-jetting material or else a separate water source. In most applications, it is more efficient and effective to use the slurry. Once the proper depth is achieved, the tip or nozzle 78 of the probe 70 is advanced slowly, more or less vertically, through the zone 104. The high pressure fluid serves to fracture or loosen some soils and spreads out under pressure as indicated at 120. As the probe advances down through the zone 104, it creates a generally cylindrical volume or core 110 of infused fluid.

Figure 3:
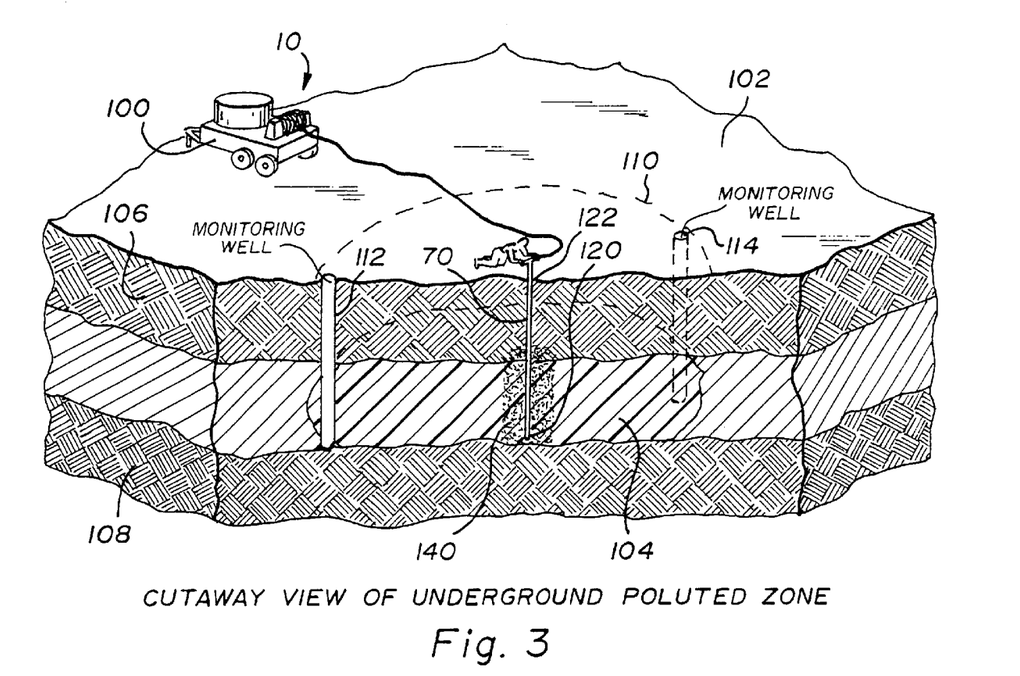
FIG. 3 is a view similar to that of FIG. 2 with a probe moved to a deeper location.

The probe 70 is jetted down to the bottom of the zone 104 as shown in FIG. 3. The probe may be slowly advanced up and down to run the nozzle 120 through the zone 104 to establish the first core 140. This is continued until the core has been saturated as indicated by the welling up at the surface of the fluid from about the entry point 122 of the probe. When this occurs, the probe is removed and reinserted at a relatively short distance away and driven vertically.

The following case studies involve the use of the present invention to cost-effectively accomplish one or more of the following goals:

a) perform real-time oxidation of nonaqueous phase liquids (NAPLs);
  b) perform real-time oxidation of dissolved phase contaminants; and
  c) enhance intrinsic biodegradation processes.

The method includes direct injection technology to introduce a fluid of water and a novel powdered formulation or mixture directly into subsurface contaminated media.

The major limiting factor for those practicing oxidation and biodegradation technologies has been the ability to safely and cost-effectively place reagents or bioenhancement fluids in contact with the contaminated media. Low permeability sites present a much greater challenge to practitioners of these technologies than do higher permeability sites. Logic dictates and experience shows that the appropriate amendment fluids must be delivered to the full vertical and areal extent of contamination to maximize effectiveness.

This direct injection approach significantly reduces dependency upon natural migration and maximizes contact with the contaminated media.

Lateral pressure from the soil on the probe wall above the injection nozzle effectively seals the probe hole and minimizes leakage to the surface. The probe is rapidly advanced to the contaminated zone and then more slowly advanced through the contaminated interval. The high pressure forces the amendment fluid into the formation temporarily enhancing permeability in the near radius of the probe hole via a limited degree of hydraulic fracturing. Amendment fluid is also forced into the migration pathways of the natural soil. The site-specific radius of influence can easily be determined on-site by observing communication of amendment fluid between probe holes. The spacing of the treatment points can be easily adjusted in the field to compensate for changes in subsurface conditions.

This technology can be utilized to treat unsaturated and/or saturated media. It can also be utilized to very selectively treat migration pathways, unsaturated smear zones and secondary source areas. Direct injection technology can also be utilized to establish oxygen barriers to limit off-site migration or to "chase" off-site contaminants.

The present inventive formulation is a blend of environmentally safe compounds formulated to provide a timed-release of hydroxyl radicals and perhydroxyl radicals to quickly oxidize a variety of organic contaminants and to subsequently provide residual and timed-release molecular oxygen and essential nutrients to enhance intrinsic biodegradation processes further degrading organic contaminants.

The formulation utilizes a Fenton-like chemistry to produce a controlled release of powerful oxidizing agents which oxidize a variety of organic contaminants. Complete destruction of organic contaminants results in carbon dioxide ($CO_2$) and water ($H_2O$) as the end products. Any remaining intermediate byproducts are more easily mineralized by intrinsic biodegradation processes.

Since the inventive formulation provides a slower, more controlled release of hydroxyl and perhydroxyl radicals than can be accomplished using hydrogen peroxide ($H_2O_2$), sufficient time is available for delivery and fluid interaction of the formulation over time. Oxidative reactions have been observed to occur in the subsurface for periods of time ranging from several hours to several days, dependant upon site chemistry, site geology, contaminant flux, formulation and dosage. This timed-release formulation precludes the build up of high temperatures and high vapor pressures typically encountered with the use of $H_2O_2$, thereby providing a technology that is safe to both the environment and human health. As the hydroxyl and perhydroxyl radicals have a short life span in the subsurface, they present no risk to groundwater quality.

Upon completion of the oxidation phase of this process, the amendment fluid continues to provide a timed-release of molecular oxygen to enhance intrinsic biodegradation processes. A continued release of molecular oxygen may occur for a period of two to four months, dependant upon contaminant flux, formulation and dosage. Upon depletion of the available oxygen, nutrients contained in the amendment fluid continue to provide some degree of microbial degradation.

Since the hydroxyl and perhydroxyl radicals are not selective in their destruction of organic carbon, some impact to the indigenous microbial community may be anticipated. However, due to the slower, more controlled production of radicals with the formulation, complete destruction of the microbial community is not typically encountered, unless over applied. In the event of over application, once the hydroxyl and perhydroxyl radicals are depleted, the microbial community will quickly reestablish itself due to the presence of the resulting residual oxygen and nutrients.

Due to the number of unknowns and variables encountered in the subsurface, the inventive technology is not represented as a one-time treatment technology. Multiple injections may be required to ensure complete treatment.

As will be understood by one who is skilled in the art, the current level of skills in the art do not permit precise calculations of the application rate due to numerous, site-specific variables and unknowns. Thus, the optimal dosage must be site-specifically determined by routine experiments such as bench testing and field pilot testing. Multiple applications may be required due to the heterogeneous nature of the subsurface at many sites. Typical application rates of the compound to this point have ranged from 150 grams to 1000 grams per cubic yard of contaminated media.

As will also be understood by one who is skilled in the art, the exact formulation may be varied to address site-specific conditions such as contaminant type, contaminant load, total organic carbon load, soil permeability, soil chemistry and cleanup objectives. Typical formulations may include but are not limited to the following compositions:

Formulation A

| | |
|---|---|
| 69.4% | calcium peroxide |
| 16.7% | monopotassium phosphate |
| 8.3% | monoammonium phosphate |
| 5.6% | ferric sulfate |

The above Formulation A may be utilized at lower permeability sites where sequential injection of co-reagents is not desirable. The use of a calcium peroxide and ferric sulfate allows for single batch mixing and provides a reasonable time frame for delivery into the subsurface.

Formulation B

| | |
|---|---|
| 35.3% | calcium peroxide |
| 38.2% | magnesium peroxide |
| 14.7% | monopotassium phosphate |

-continued

| | |
|---|---|
| 5.9% | monoammonium phosphate |
| 5.9% | ferric sulfate |

The above Formulation B may be used similarly to Formulation A. In particular, it may be utilized near a down-gradient property line where it is desirable to achieve short term reductions in contaminant concentrations on-site and also to provide a longer term release of molecular oxygen (due to the slower hydration rate of magnesium peroxide) to permit off-site migration of oxygen to enhance intrinsic biodegradation processes.

Formulation C

| | |
|---|---|
| 52.9% | calcium peroxide |
| 20.6% | sodium carbonate peroxylhydrate |
| 14.7% | monopotassium phosphate |
| 5.9% | monoammonium phosphate |
| 5.9% | ferrous sulfate |

The above Formulation C may be utilized where a more short term generation of higher concentrations of hydrogen peroxide (due to the faster hydration rate of sodium carbonate peroxyhydrate) is desirable to quickly reduce higher concentrations of contaminants that may be inhibiting to intrinsic biodegradation processes and to subsequently provide timed-release molecular oxygen.

Formulation D

| | |
|---|---|
| 17.6% | calcium peroxide |
| 35.3% | magnesium peroxide |
| 20.6% | sodium carbonate peroxylhydrate |
| 14.7% | monopotassium phosphate |
| 5.9% | monoammonium phosphate |
| 5.9% | ferrous sulfate |

The above Formulation D may be utilized similarly to Formulation C with the exception that it would provide a longer term release of molecular oxygen to enhance intrinsic biodegradation processes and control rebound of contaminant concentrations due to continued leaching of contaminants from areas not accessible for treatment (i.e., soils under a structure). With regard to the above formulations, the inventors have discovered that they cannot store all of these compounds in one container due to differences in pH, (product lumps up). They are packaging each compound as a separate reagent (e.g. A, B, C, D and E). The reagents are then blended on site.

EXAMPLE 1

Figure 4:
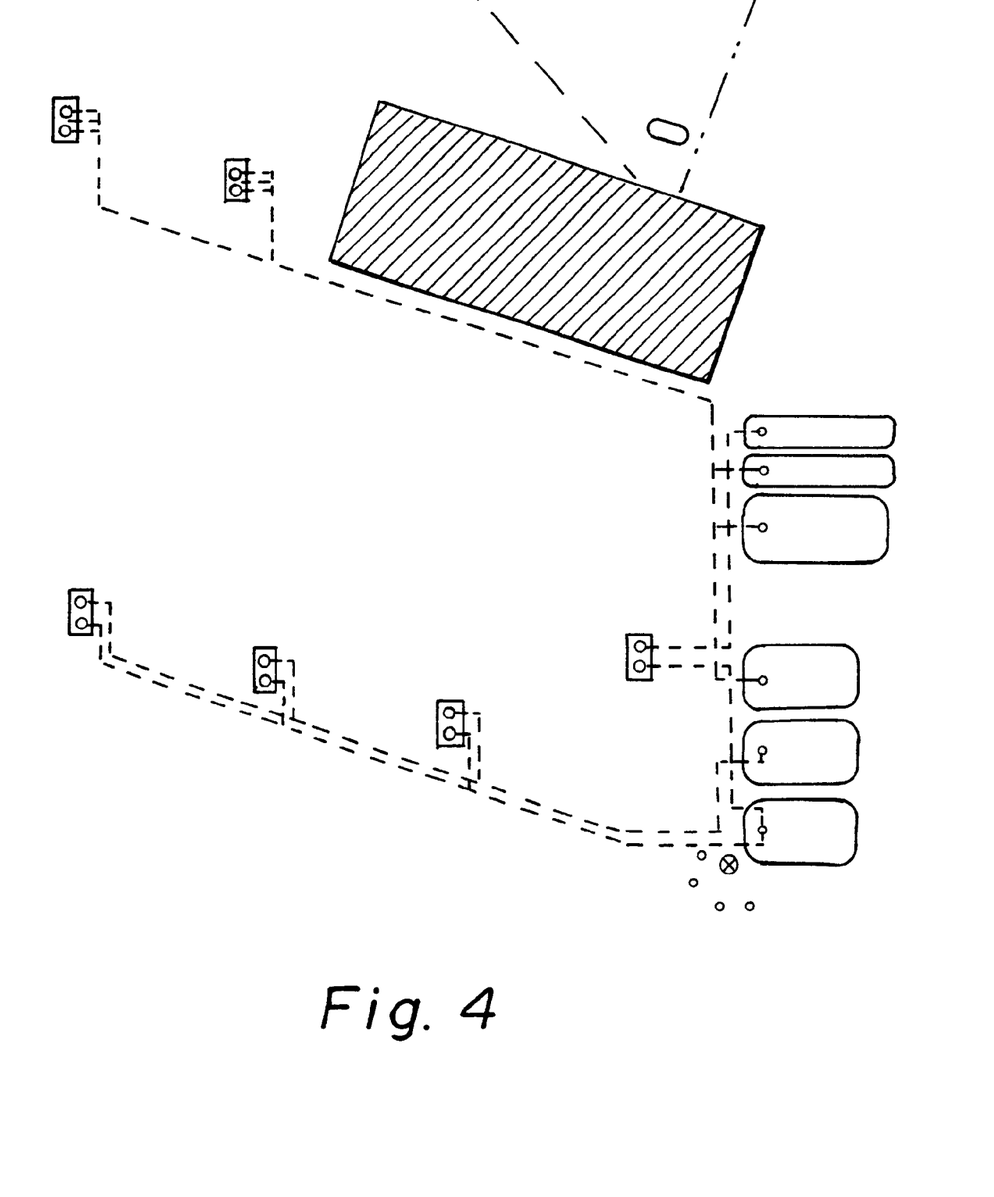
FIG. 4 is a plan diagram of an actual site which was treated by the method and with the formulation of the present invention, which is hereafter described as Example 1.

The site (FIG. 4) selected for the field test is an active service station located in northwest Indiana. A release was reported some four years earlier due to a leak in the diesel product line. The diesel lines were replaced and free product was removed from the piping trench. A twelve inch recovery sump (RW-A) was installed to a depth of six feet near the juncture of the piping trench and the underground storage tank excavation (see FIG. 4). Perched groundwater and free product have been periodically recovered from the sump.

The site is covered by concrete or asphaltic pavement and subbase to a depth of 6 to 12 inches beneath which exists silty sand to a depth of 3.5 feet to 4.5 feet. Underlying the silty sand is a silty clay and trace fine to coarse sand and trace fine gravel to end of boring. Although no groundwater was encountered during the site investigation, perched water and free product were encountered in the piping trench and recovery sump.

A field experiment was conducted to determine the effectiveness of the composition of this invention and the direct injection process in oxidizing Light Non Aqueous Phase Liquids (LNAPLs) on a real-time basis. No effort was made to treat the full extent of free product.

Prior to treating the area, LNAPLs were observed in the recovery well. A Model KIR-96 (manufactured by Keck Instruments, Inc., of Williamston, Mich.) interface probe was utilized to gauge the elevations of the LNAPLs and the perched water. Based on these measurements, the thickness of the LNAPLs was calculated to be 0.03 feet (approximately 0.375 inches).

The following formulation (Formulation A above) was blended on site and mixed with water to form a slurry for direct injection:

| | |
|---|---|
| 69.4% | calcium peroxide |
| 16.7% | monopotassium phosphate |
| 8.3% | monoammonium phosphate |
| 5.6% | ferric sulfate |

Approximately forty gallons of this slurry were injected over four treatment points surrounding the recovery well. The slurry was made up in approximately 5 to 10 minutes and injected over a period of 10 to 15 minutes immediately thereafter. Prior to completion of the injection, foaming was observed in the recovery well. Approximately twenty minutes after implementing the injection process, the recovery well was again gauged for the presence of LNAPLs. No measurable LNAPLs were encountered. A water sample was retrieved from the well with a disposable bailer and examined for free product indications (i.e, film or sheen). No free product indications were observed and hydrocarbon odors were significantly reduced. The well was subsequently inspected three days and eleven days after treatment. No free product indications were observed on either occasion. This field test was limited to field observations and measurements.

Four ¾ inch surface access points were drilled through the paving surrounding the recovery well at a distance of approximately four feet. A slurry of approximately 12% (wt/wt) of the formulation to water was prepared at the site and injected at the four treatment points at an interval of 2 to 6 feet below ground surface.

Field measurements and observations indicate that free phase hydrocarbons were oxidized in situ on a real-time basis. In addition, the reduced hydrocarbon odors may indicate that some dissolved phase hydrocarbons were also oxidized. Although further evaluation is planned, this preliminary field test indicates that the direct injection of the formulation represents a rapid, cost-effective method of abating free phase hydrocarbons.

EXAMPLE TWO

A second field test was conducted to evaluate the effectiveness of the composition of this invention and the direct injection process in reducing dissolved phase contaminants on a real-time basis. The contaminants of concern at this site were benzene, toluene, ethylbenzene and xylene (BTEX). The site is an active service station and a 40×40 foot area surrounding MW-1 (FIG. 5) was selected for the field test.

The site is an active service station located in northwest Indiana. A release was reported in May 1994 as the result of the Phase II Property Transfer Assessment. Subsequently, a site investigation was conducted to define the extent of contamination. As high benzene concentrations were previously observed in MW-1, it was decided to conduct a field pilot test to determine the effectiveness of directly injecting the inventive formulation into the contaminated area to significantly reduce BTEX concentrations.

The site is covered by concrete or asphaltic pavement and subbase to a depth of 6 to 12 inches beneath which exists a silty sand to a depth of twelve feet where a silty clay was encountered to end of boring (approximately 15 feet). Groundwater was encountered at a depth of approximately six feet below ground surface.

Figure 5:
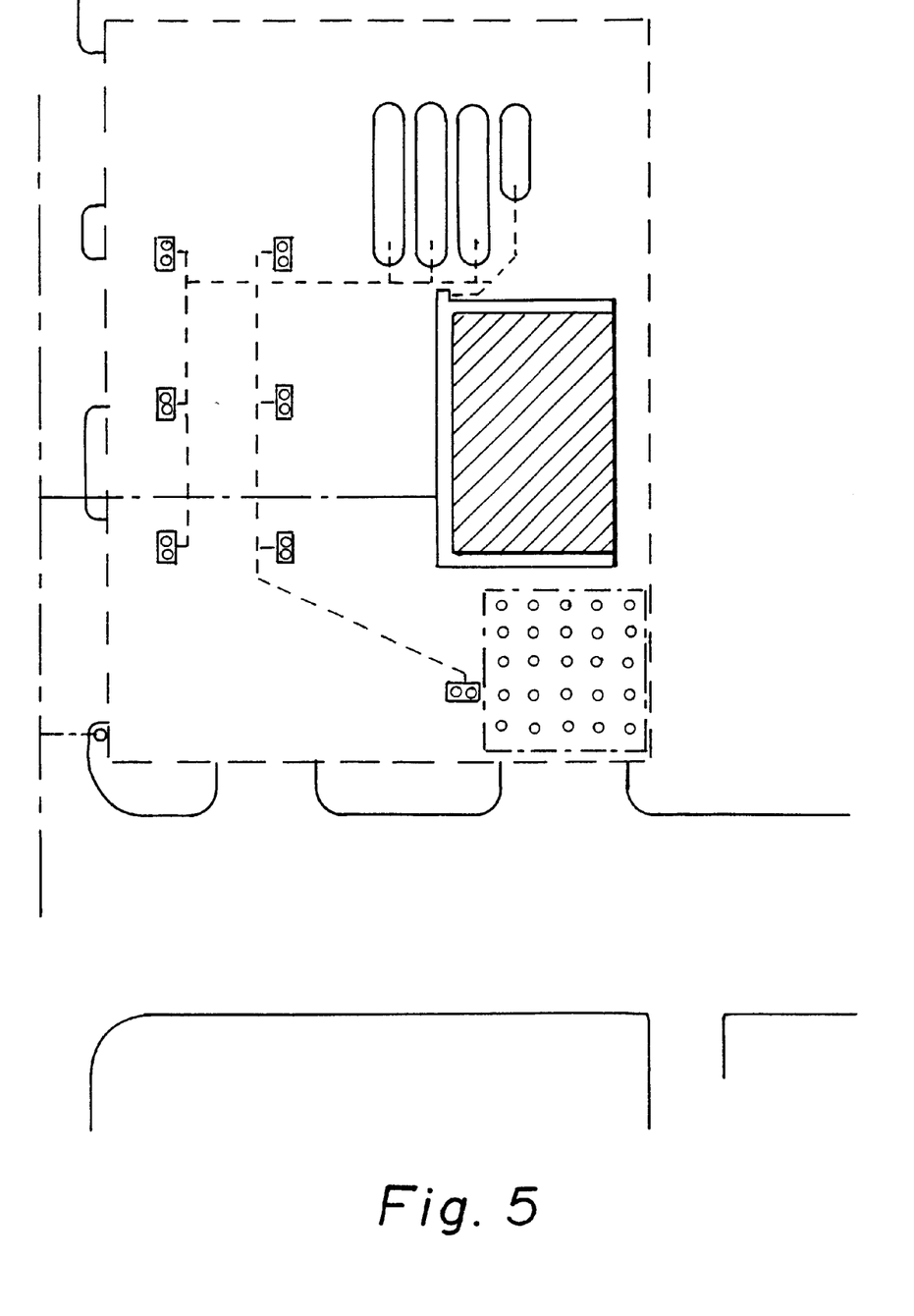
FIG. 5 is a plan diagram of a second actual site which was treated by the method and with the formulation of the present invention, which is hereafter described as Example 2.

The area to be treated was approximately 40 feet by 40 feet and surrounded MW-1 as shown in FIG. 5. The vertical extent of the treatment was from 4 to 9 inches below ground surface. Prior to conducting the pilot test, a groundwater sample was collected from MW-1 and submitted for BTEX and microbial analyses. In-1 situ measurements were taken for temperature (69.6 degrees F) and dissolved oxygen (2.1 ppm). The following formulation was blended on site and mixed with water for direct injection:

| | |
|---|---|
| 35.3% | calcium peroxide |
| 38.2% | magnesium peroxide |
| 20.6% | monopotassium phosphate |
| 5.9% | ferric sulfate |

A grid of twenty four ¾ inch surface access points were drilled through the paving. Hole spacing was approximately eight feet. A slurry of approximately 6% (wt/wt) of the invention formulation to water was blended at the site. Approximately twelve gallons of the inventive formulation were injected into the subsurface at each of the treatment points. During the injection process, foaming was observed in the probe holes and MW-1.

During the injection process, a data logger was utilized to record down-hole measurements for temperature and dissolved oxygen (DO) concentrations for a fifteen minute period. Near the end of the fifteen minute period, dissolved oxygen concentrations increased from a background of 2.1 ppm to greater than 50 ppm (exceeded upper limit of instrument) and temperature had increased from a background of 69.9 degrees F to a high of 80.7 degrees F and had begun to decrease indicating that the initial reaction was complete.

Two days after injection, in-situ measurements were taken for temperature and DO at MW-1. Groundwater temperature had returned to the original background of 69.9 degrees F. The DO concentration was measured at 19.3 ppm. A groundwater sample was collected at MW-1 and submitted for BTEX analyses. The pre-treatment and post-treatment analytical results are shown in Table 1.

TABLE 1

Analytical Results MW-1

| Compound | 10-7-97 | 10-9-97 | % of Decreases |
|---|---|---|---|
| Benzene | 2.99 | 0.799 | 73.3 |
| Ethylbenzene | 0.829 | 0.398 | 52.0 |
| Toluene | 0.146 | 0.026 | 82.2 |
| Xylenes | 2.77 | 0.689 | 75.1 |
| Total BTEX | 6.735 | 1.911 | 71.6 |

All results expressed as mg/l

Nine days after injection, a groundwater sample was collected from MW-1 and submitted for microbial analyses. The pretreatment and post treatment microbial analyses are shown in Table 2.

TABLE 2

Microbial Analyses MW-1

| Sampling Date | October 7, 1998 | October 16, 1998 |
|---|---|---|
| Plate Count (CFU/ml) | $1.19 \times 10^5$ | $2.35 \times 10^6$ |
| No. Strains Present | 3 | 5 |
| No. Degraders | 1 | 2 |

Analytical data indicates that the inventive formulation reduced benzene concentrations by 73.3% and total BTEX concentrations by 71.6% within a 2 day time frame. Although the benzene concentration at MW-1 was not reduced to the cleanup objective of 5 ppb, it is anticipated that further degradation will occur due to the presence of residual and timed-released oxygen and the presence of alternate electron acceptors contained in the inventive formulation. A higher application rate of the formulation probably would have resulted in additional decreases in contaminant concentrations, possibly to closure level.

Figure 7:
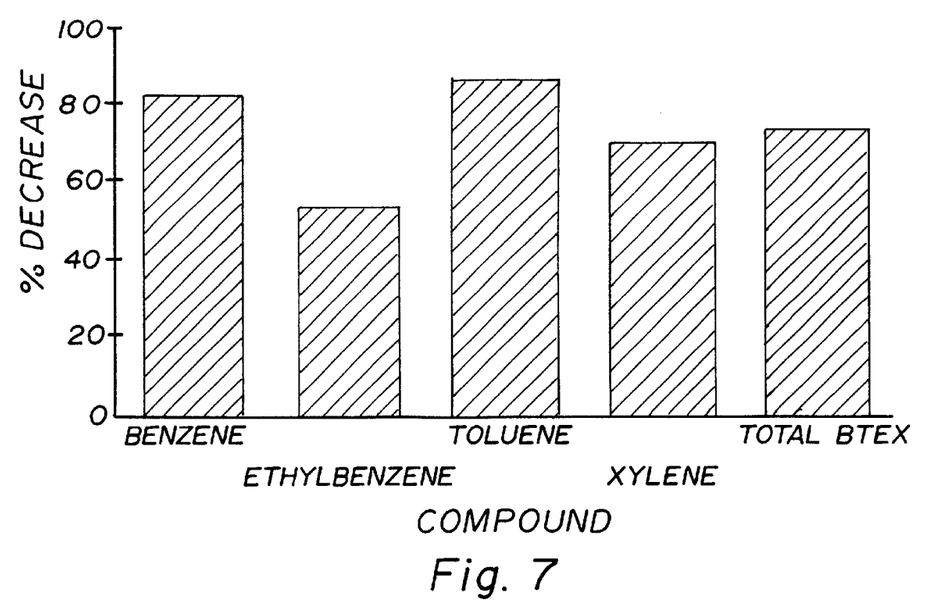
FIG. 7 is a chart illustrating reductions in contaminant concentrations in accordance with Example 2.
Figure 8:
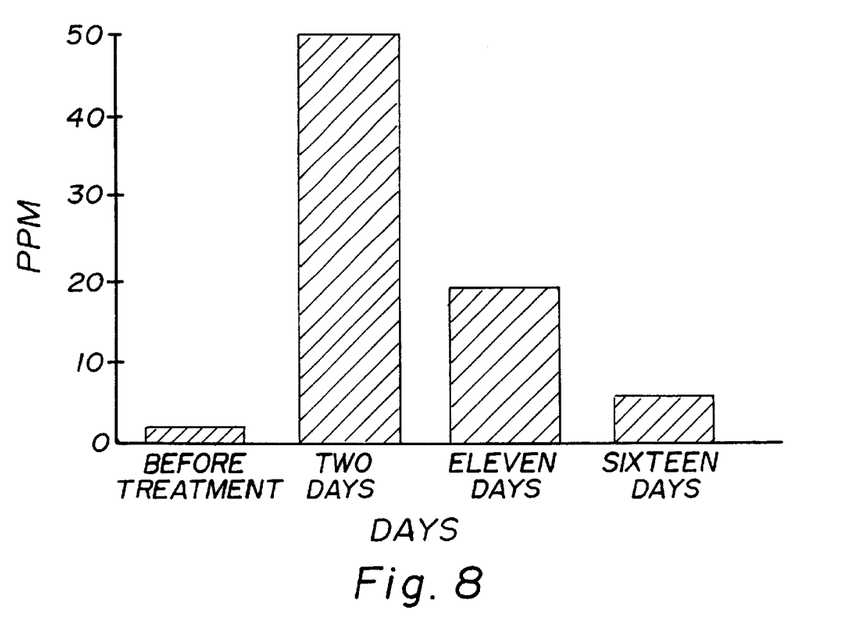
FIG. 8 is a chart showing an increase in the dissolved oxygen (DO) concentration in accordance with Example 2.
Figure 9A:
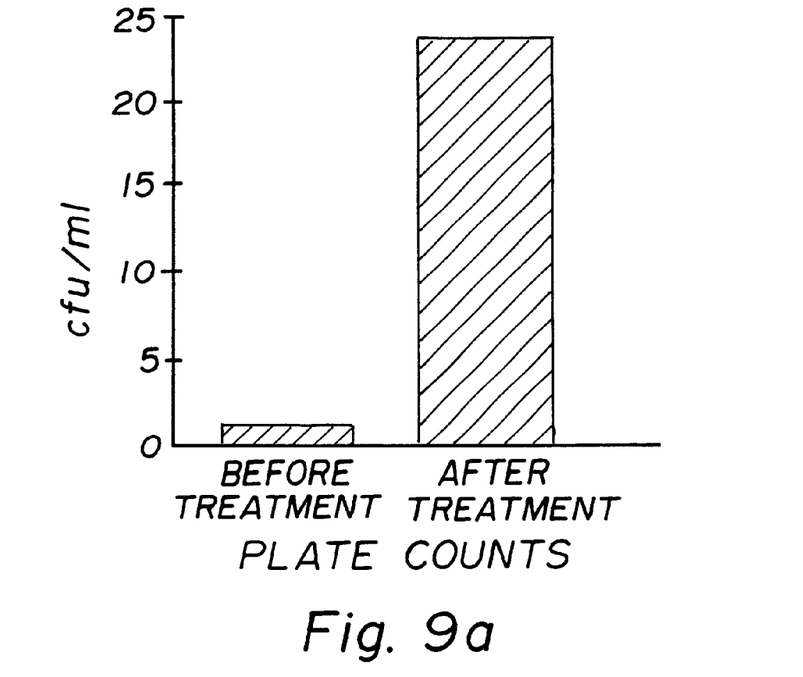
FIGS. 9(A) and 9(B) are charts illustrating increases in total heterotrophic plate counts and in the number of good contaminant degraders in accordance with Example 2.
Figure 9B:
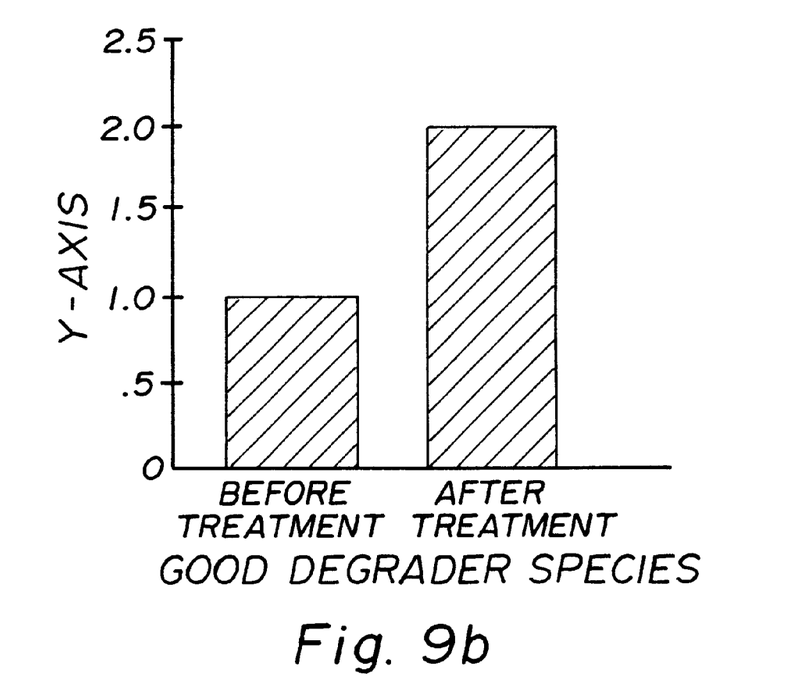

The microbial data indicates that the total heterotrophic plate count was increased by more than one order of magnitude and that the number of strains and the number of degraders were also significantly increased. See FIG. 7, FIG. 8 and FIG. 9 which illustrate the large decrease in the tested for contaminants of benzene, toluene, ethylbenzene and xylene (BTEX), the increase in dissolved oxygen after treatment and the increase of plate counts and degrader species after treatment.

EXAMPLE 3

Figure 6:
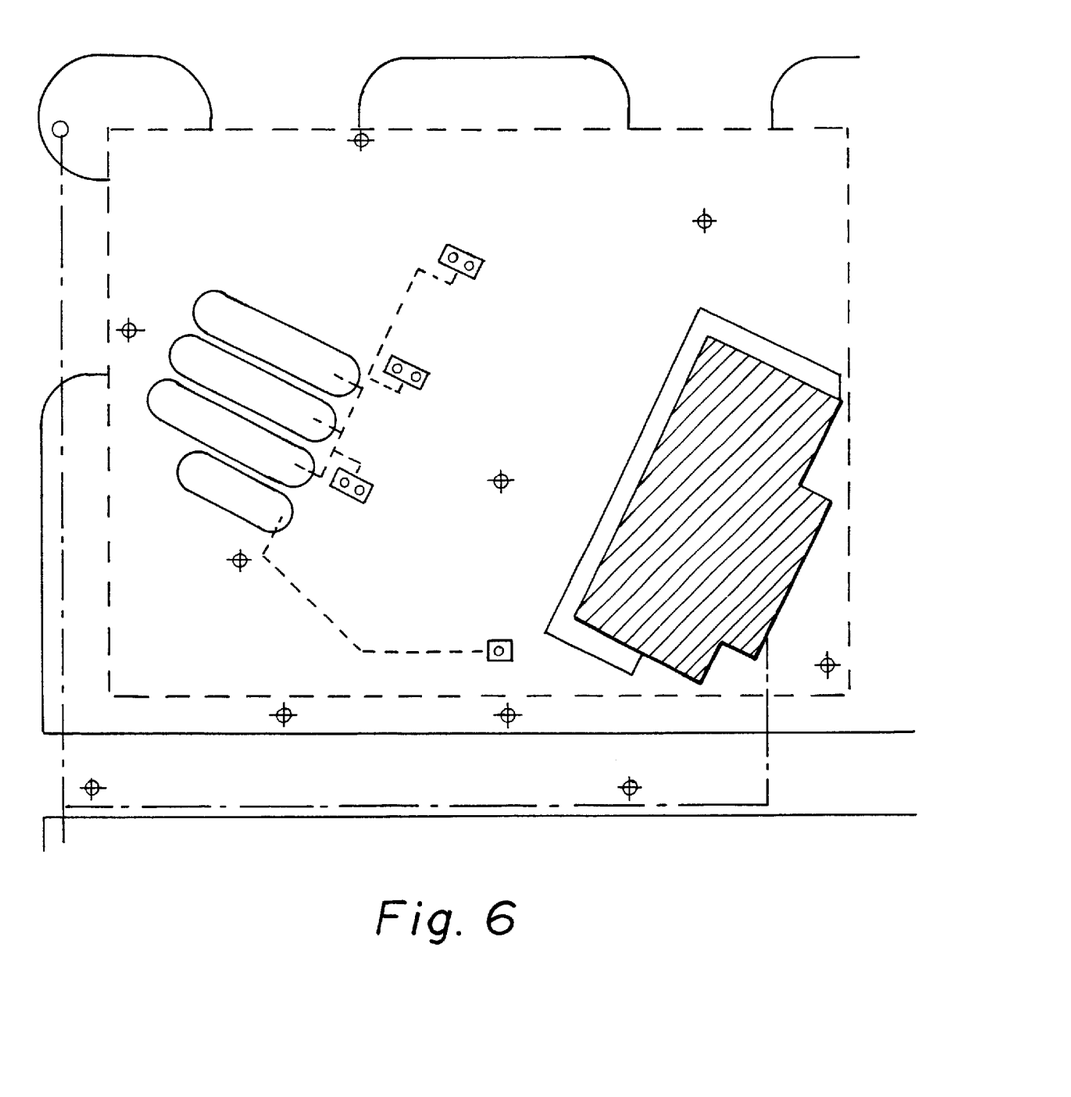
FIG. 6 is a plan diagram of an actual third site which was treated by the method and with the formulation of the present invention, which is hereafter described as Example 3.

A field test (FIG. 6) was conducted similar to Example 2 except that significantly higher concentrations of dissolved phase BTEX contaminants were present. A 40×40 foot area surrounding each of monitoring wells MW-4 and MW-10A was selected for the field test. As higher contaminant concentrations were present, the following formulation was blended on site and mixed with water for direct injection:

| | |
|---|---|
| 52.9% | calcium peroxide |
| 20.6% | sodium carbonate peroxyhydrate |
| 20.6% | monopotassium phosphate |
| 5.9% | ferric sulfate |

A grid of twenty-four ¾ inch surface access points were drilled through the paving. Hole spacing was approximately eight feet. Approximately twelve gallons of the inventive formulation were injected from three feet below ground surface (BGS) to eight feet BGS at each of the treatment points. During the injection process, foaming was observed in the probe holes and monitoring wells.

Both areas were similarly re-treated approximately three months after the initial injection. Groundwater samples were collected for BTEX analyses and microbial analyses at various periods prior to and after treatments. The analytical results are shown in FIG. 10. These results indicate that BTEX concentrations in MW-4 have been significantly reduced (72.5%) within a relatively short time (approximately five months). Although it is anticipated that additional reductions in BTEX concentrations will occur over time due to microbial degradation, additional work may be required in this area due to the initially high concentrations. The analytical results for MW-10A indicate that a 100% reduction in BTEX MW-4 was increased by four orders of magnitude.

sodium carbonate peroxyhydrate, magnesium peroxide, sodium acid pyrophosphate and ferrous sulfate;

sodium carbonate peroxyhydrate, magnesium peroxide, sodium acid pyrophosphate and ferric sulfate;

sodium carbonate peroxyhydrate, magnesium peroxide, trisodium pyrophosphate and ferric sulfate;

sodium carbonate peroxyhydrate, monopotassium phosphate and ferric sulfate;

sodium carbonate peroxyhydrate, monopotassium phosphate and ferrous sulfate;

sodium carbonate peroxyhydrate, sodium acid pyrophosphate and ferric sulfate; and sodium carbonate peroxyhydrate, sodium acid pyrophosphate and ferrous sulfate.

While particular embodiments of the invention have been shown and described, it will be obvious to those in the art that changes and modifications may be made without departing from the invention and, therefore, the aim in the

TABLE 3

MW-4

| Compound | Treatment Date | 8 days after Treatment | 22 days after Treatment | 52 days after Treatment | 66 days after Treatment | 84 days after Treatment | 130 days after Treatment | Reduction |
|---|---|---|---|---|---|---|---|---|
| Benzene | 15.1 | 4.61 | 9.12 | 6.35 | 5.712 | 3.36 | 3.36 | 77.7% |
| Ethylbenzene | 0.971 | 0.058 | 0.324 | 0.407 | 0.226 | 0.094 | 0.299 | 69.2% |
| Toluene | 0.971 | ND | 0.098 | 0.101 | 0.312 | 0.074 | 0.081 | 62.7% |
| Xylene | 1.79 | 0.092 | 0.977 | 1.49 | 1.55 | 0.561 | 1.24 | 30.7% |
| Total BTEX | 1.078 | 4.76 | 10.519 | 8.352 | 7.8 | 4.089 | 4.98 | 72.5% |

MW-10A

| Compound | 40 days before Treatment | 10 days after Treatment | 22 days after Treatment | 52 days after Treatment | 66 days after Treatment | 84 days after Treatment | 130 days after Treatment | Reduction |
|---|---|---|---|---|---|---|---|---|
| Benzene | 5.12 | 1.99 | 0.834 | 0.106 | 0.061 | 0.027 | ND | 100.0% |
| Ethylbenzene | 0.311 | 0.017 | 0.018 | 0.005 | 0.008 | 0.021 | ND | 100.0% |
| Toluene | 0.078 | ND | ND | 0.005 | ND | 0.022 | ND | 100.0% |
| Xylene | 0.306 | ND | 0.008 | ND | ND | 0.062 | ND | 100.0% |
| Total BTEX | 5.82 | 2.037 | 0.86 | 0.116 | 0.069 | 0.132 | ND | 100.0% |

Total Heterotrophic Plate Counts
MW-4
CFU/ml

| 24 Hours After Treatment | 48 Hours After Treatment |
|---|---|
| $1.57 \times 10^3$ | $1.77 \times 10^3$ |
| $7.60 \times 10^6$ | $2.40 \times 10^7$ |

ND - Not Detected
All results expressed in ppm

Other formulations can include:

calcium peroxide, magnesium peroxide, monopotassium phosphate and ferric sulfate;

calcium peroxide, sodium carbonate peroxyhydrate, sodium acid pyrophosphate and ferric sulfate;

calcium peroxide, magnesium peroxide, sodium acid pyrophosphate and ferric sulfate;

calcium peroxide, sodium carbonate peroxyhydrate, sodium acid pyrophosphate and ferrous sulfate;

calcium peroxide, magnesium peroxide, sodium acid pyrophosphate and ferrous sulfate;

sodium carbonate peroxyhydrate, magnesium peroxide, monopotassium phosphate and ferric sulfate;

sodium carbonate peroxyhydrate, magnesium peroxide, monopotassium phosphate and ferrous sulfate;

appended claims is to cover all such changes and modifications as fall within the true spirit and scope of the invention.

For example, there may be situations where it might be beneficial to use a high concentration of ferrous sulfate in the formulation. If this concentration is too high and especially if the formulation contains sodium carbonate peroxyhydrate, the present inventors have learned by experimentation that premature reactions in the mixing tank may occur. In those relatively rare situations this premature reaction can be avoided by injecting part or all of the ferrous sulfate separately just after injecting the other components so that the reaction occurs underground. This can be accomplished by, after injecting a first tank load, mixing the additional ferrous sulfate with water in the tank and immediately injecting it in the identical manner and location as the first load.

What is claimed is:

1. A process for treating a zone of underground hydrocarbon contamination which is at a level above that which is desired comprising the steps of:
   (A) determining the approximate pH and organic carbon load of the zone;
   (B) providing a dry powdered mixture of:
      a) a peroxide of one or more of Calcium, Magnesium, or other metallic peroxides;
      b) pH adapters to maintain the pH of the fluid in an underground zone to approximately 7 to 9;
      decomposition rate modifiers; and
   (C) providing a quantity of water,
   (D) mixing the dry ingredients with the water to form a slurry;
   (E) immediately thereafter injecting in situ said slurry into the contaminated underground zone and allowing it to partially or wholly react with the hydrocarbon contamination; and
   (F) after a period of time, testing the zone to determine the level of contamination and repeating at least Steps (B), (C), (D) and (E) of the process until a level of contamination below the acceptable level is detected by testing.

2. The process of claim 1 wherein the dry powder mixture of step (B) also includes a decomposition rate modifier that controls the reaction rate of the peroxide with the water so as to ensure that such reaction substantially occurs in situ and over a period of time.

3. The process of claim 2 wherein the dry powder mixture includes calcium peroxide, monopotassium phosphate, monoammonium phosphate, and ferric sulfate.

4. The process of claim 2 wherein the dry powder mixture includes calcium peroxide, magnesium peroxide, sodium carbonate peroxylhydrate, monopotassium phosphate, monoammonium phosphate, and ferrous sulfate.

5. The process of claim 2 wherein the dry powder mixture includes calcium peroxide, sodium carbonate peroxylhydrate, monopotassium phosphate, monoammonium phosphate, and ferrous sulfate.

6. The process of claim 2 wherein the dry powder mixture includes calcium peroxide, magnesium peroxide, monopotassium phosphate and ferric sulfate.

7. The process of claim 2 wherein the dry powder mixture includes calcium peroxide, sodium carbonate peroxyhydrate, monopotassium phosphate, monoammonium phosphate and ferric sulfate.

8. The process of claim 2 wherein the dry powder mixture includes calcium peroxide, magnesium peroxide, sodium acid pyrophosphate and ferric sulfate.

9. The process of claim 2 wherein the dry powder mixture includes calcium peroxide, sodium carbonate peroxyhydrate, sodium acid pyrophosphate and ferrous sulfate.

10. The process of claim 2 wherein the dry powder mixture includes calcium peroxide, magnesium peroxide, sodium acid pyrophosphate and ferrous sulfate.

11. The process of claim 2 wherein the dry powder mixture includes sodium carbonate peroxyhydrate, magnesium peroxide, monopotassium phosphate and ferric sulfate.

12. The process of claim 2 wherein the dry powder mixture includes sodium carbonate peroxyhydrate, magnesium peroxide, monopotassium phosphate and ferrous sulfate.

13. The process of claim 2 wherein the dry powder mixture includes sodium carbonate peroxyhydrate, magnesium peroxide, sodium acid pyrophosphate and ferrous sulfate.

14. The process of claim 2 wherein the dry powder mixture includes sodium carbonate peroxyhydrate, magnesium peroxide, sodium acid pyrophosphate and ferric sulfate.

15. The process of claim 2 wherein the dry powder mixture includes sodium carbonate peroxyhydrate, magnesium peroxide, monoammonium phosphate and ferric sulfate.

16. The process of claim 2 wherein the dry powder mixture includes sodium carbonate peroxyhydrate, monopotassium phosphate and ferric sulfate.

17. The process of claim 2 wherein the dry powder mixture includes sodium carbonate peroxyhydrate, monopotassium phosphate and ferrous sulfate.

18. The process of claim 2 wherein the dry powder mixture includes sodium carbonate peroxyhydrate, sodium acid pyrophosphate and ferric sulfate.

19. The process of claim 2 wherein the dry powder mixture includes sodium carbonate peroxyhydrate, sodium acid pyrophosphate and ferrous sulfate.

20. The method of claim 1 wherein said slurry generates hydrogen peroxide, hydroxyl radicals and perhydroxyl radicals in situ on a timed-release basis, thereby allowing said slurry to be placed in situ before the generation of said hydrogen peroxide substantially occurs.

* * * * *